INVENTOR.
ERNST S. SELMER
BY
Christie, Parker & Hale
ATTORNEYS

Aug. 4, 1964 E. S. SELMER 3,143,644

CONTROL APPARATUS FOR DIGITAL COMPUTERS

Filed Sept. 9, 1954 4 Sheets-Sheet 2

INVENTOR.
ERNST S. SELMER
BY
Christie, Parker & Hale
ATTORNEYS

INVENTOR.
ERNST S. SELMER
BY
Christie, Parker & Hale
ATTORNEYS

CONTROL APPARATUS FOR DIGITAL COMPUTERS

Filed Sept. 9, 1954 4 Sheets-Sheet 4

INVENTOR.
ERNST S. SELMER
BY
Christie, Parker & Hale
ATTORNEYS

United States Patent Office 3,143,644
Patented Aug. 4, 1964

3,143,644
CONTROL APPARATUS FOR DIGITAL COMPUTERS

Ernst S. Selmer, Oslo, Norway, assignor, by mesne assignments, to Burroughs Corporation, Detroit, Mich., a corporation of Michigan Filed Sept. 9, 1954, Ser. No. 454,889
10 Claims. (Cl. 235—157)

This invention relates to apparatus and methods for controlling the operation of a digital computer, and it has particular reference to apparatus for causing an internally programmed computer to change from one series of commands to another series of commands in response to certain conditions which occur within the computer while computations are being effected.

In internally programmed, automatic computers, a storage medium is ordinarily employed as an internal memory for storing operands and commands which designate programs to be carried out automatically by the computer.

In one type digital computer, each command comprises an order portion and an address portion. The order portion of the command indicates the operation which is to be performed by the computer, and the address portion of the command indicates the address in the storage medium of numerical information upon which the operation is to be performed. The address portion may also indicate the address in the storage medium at which an intermediate result or the answer is to be stored.

The storage medium is divided into addresses or cells which are numbered to distinguish them from one another, and the respective commands and operands are stored in individual cells.

Larger command programs are usually made up of a series of subprograms, and each subprogram ordinarily comprises a sequence of commands located in addresses or cells which increase in numerical order. In many instances it is necessary for the computer to change from one sequence of commands in one subprogram to another sequence of commands in another subprogram during the computations. In accordance with the present invention, such change of control is effected automatically in response to certain conditions which occur within the computer.

In a preferred embodiment of the invention, an address register is provided for alternately registering the address of each command to be fetched and the address portions of the respective commands which are fetched. Ordinarily, the address register serves to successively select commands at addresses which increase in numerical order for execution in the computer. Sensing means is provided for sensing certain conditions in the computer, and means is coupled between the sensing means and the address register for causing the address register to register the address designated by the last preceding command in response to certain conditions which may occur in the computer. Thus, a series of commands is executed in numerical order until a certain condition is sensed in the computer which causes the numerical sequence to start at the address designated by the last preceding command which was registered in the address register.

Such an arrangement provides a rapid and completely automatic means for changing from one sequence of commands to a different sequence of commands. The arrangement is particularly useful in a fixed decimal point computer. In such a computer the logics require that all operations be performed on numbers of absolute value less than "1." Thus, if two numbers less than "1" are added or divided algebraically, it is possible that their sum or quotient be equal to or greater than "1" and in which case an arithmetic overflow occurs. If such is the case, it is generally necessary that the computer be prevented from going on to the next command which is located in the next address in numerical order. The computer should change from the sequence which it has been following to a different sequence of commands which serves to convert the operation so that computations are effected on numbers of absolute value less than "1." This change of sequence may be controlled by storing a conditional transfer order after an arithmetic command which it is anticipated will produce an overflow whereby upon sensing the overflow and the conditional transfer order the sequence of commands will be changed.

In accordance with the present invention, such change of control is effected by employing a single bi-stable toggle in conjunction with a plurality of pulse generators for controlling the operation of the address register. Any desired number of sensing arrangements may be employed to control the operation of the bi-stable toggle, so that the bi-stable toggle may be employed to alter the operation of the computer in response to any one of several conditions which may occur within the computer.

The invention is explained in detail with reference to the drawings, in which.

In a typical binary-coded decimal-type computer, the individual digits of a number having a plurality of digits are each coded in a binary code notation ranging from 0 to 9. The binary notation is in the 1–2–4–8 system of counting, and a column of four bistable circuits may be employed to register each digit. The 1–2–4–8 system of counting may be illustrated as follows:

*Table I*

| | Binary Code | | | |
|---|---|---|---|---|
| Toggle | 1 | 2 | 4 | 8 |
| Decimal Number: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

where "1" indicates one condition of operation in a bi-stable circuit and "0" indicates another condition of operation.

If the four bi-stable circuits which are employed to register each digit are designated by the numbers 1, 2, 4 and 8, the digit which is registered is equal to the sum of the numbers represented by the bi-stable circuits which are actuated to the "1" condition.

The heavy lines on the drawings indicate information transfer links which are capable of passing the binary code information with respect to each digit of a series of digits in time parallel along one or more of the links. That is, each of these information transfer links is capable of conveying all of the binary code information with respect to a single digit at one time.

Internally programmed digital computers usually operate in fetch and execute cycles, wherein a command is fetched from the internal memory during the fetch cycle, and the command which has been fetched is executed during the execute cycle.

Figure 1:
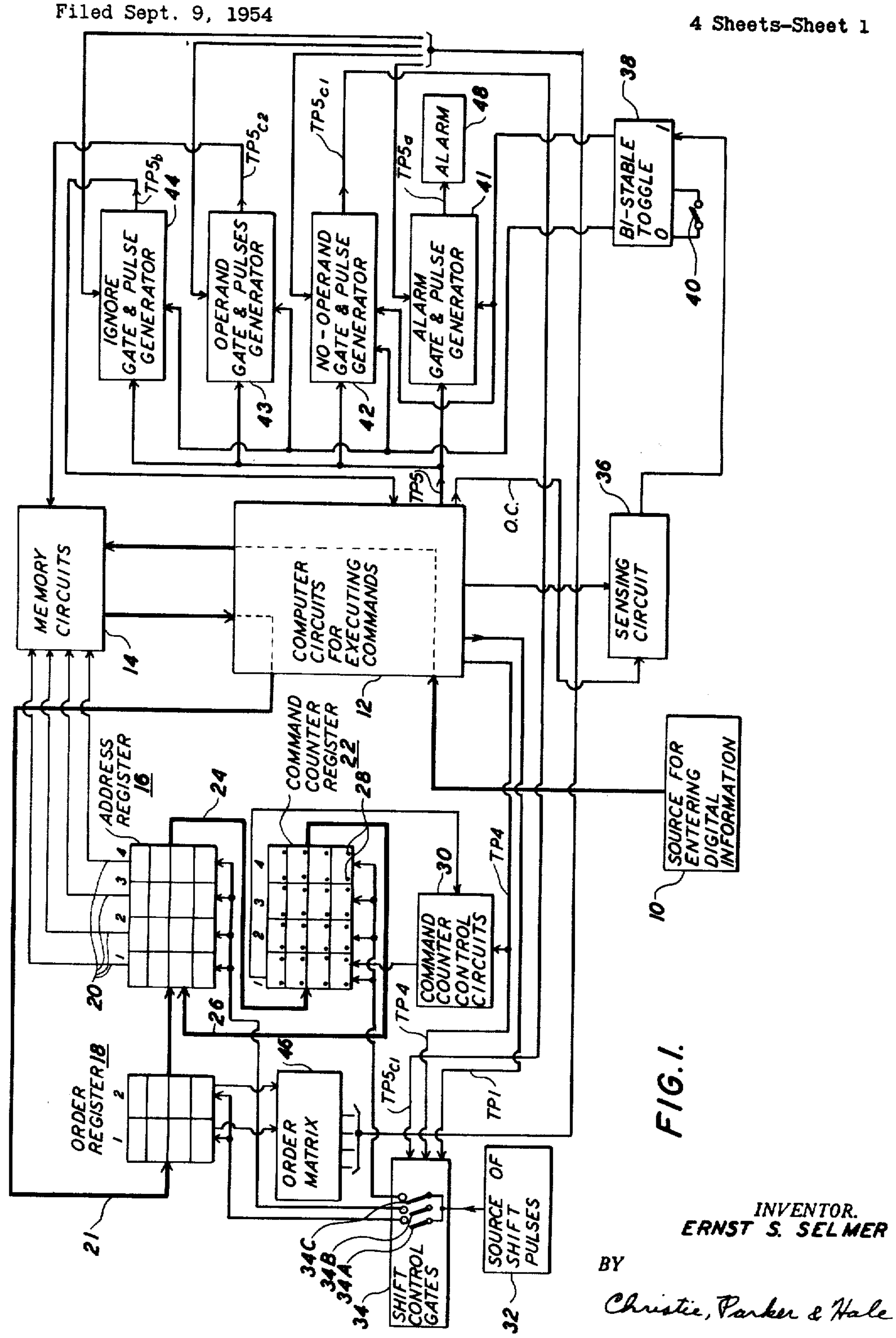
FIG. 1 is a block diagram illustrating the control apparatus of the present invention.

Each of the cycles of operation include a number of separate and distanct operations which are ordinarily initiated by pulse signals. The pulse signals indicated on FIG. 1 are numbered to correspond with those shown on the more detailed disclosure of FIGS. 4 and 5 so that the corresponding portions of each cycle may be identified on the two sets of drawings. The pulses TP–1 to TP–4 occur during the fetch cycle of operation and the pulses TP–5 to TP–7 comprise the execute cycle of operation.

The control apparatus of the present invention is arranged to operate at the end of the fetch cycle and at the beginning of the execute cycle of operation so that the control action may be determined by the command which has just been fetched and is ready for execution.

Figure 4:
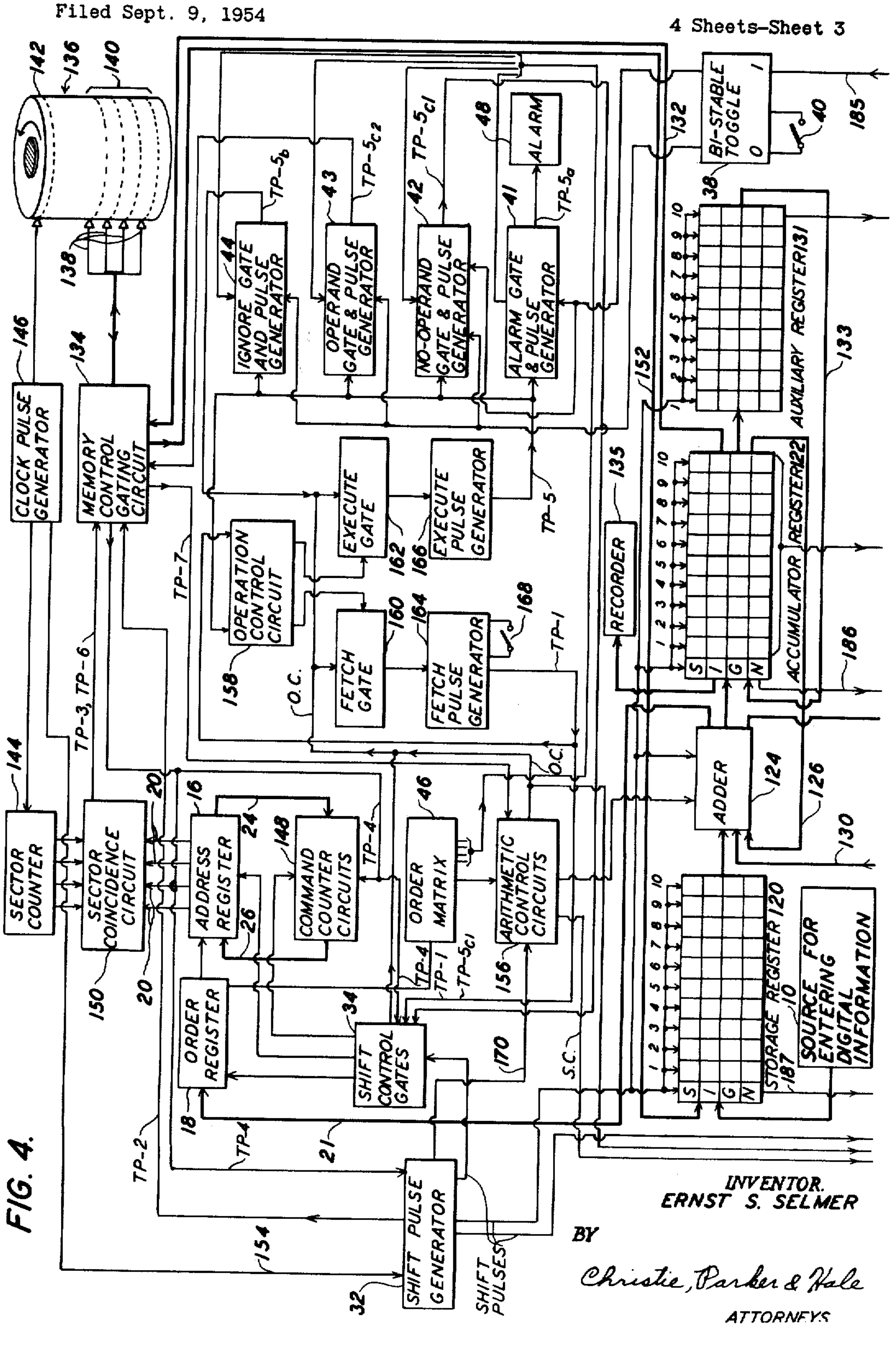
FIGS. 4 and 5 show how the apparatus of FIG. 1 may be employed in one type of computer, with the apparatus being employed to provide a control action in response to any one of five conditions which may occur within the computer.
Figure 5:
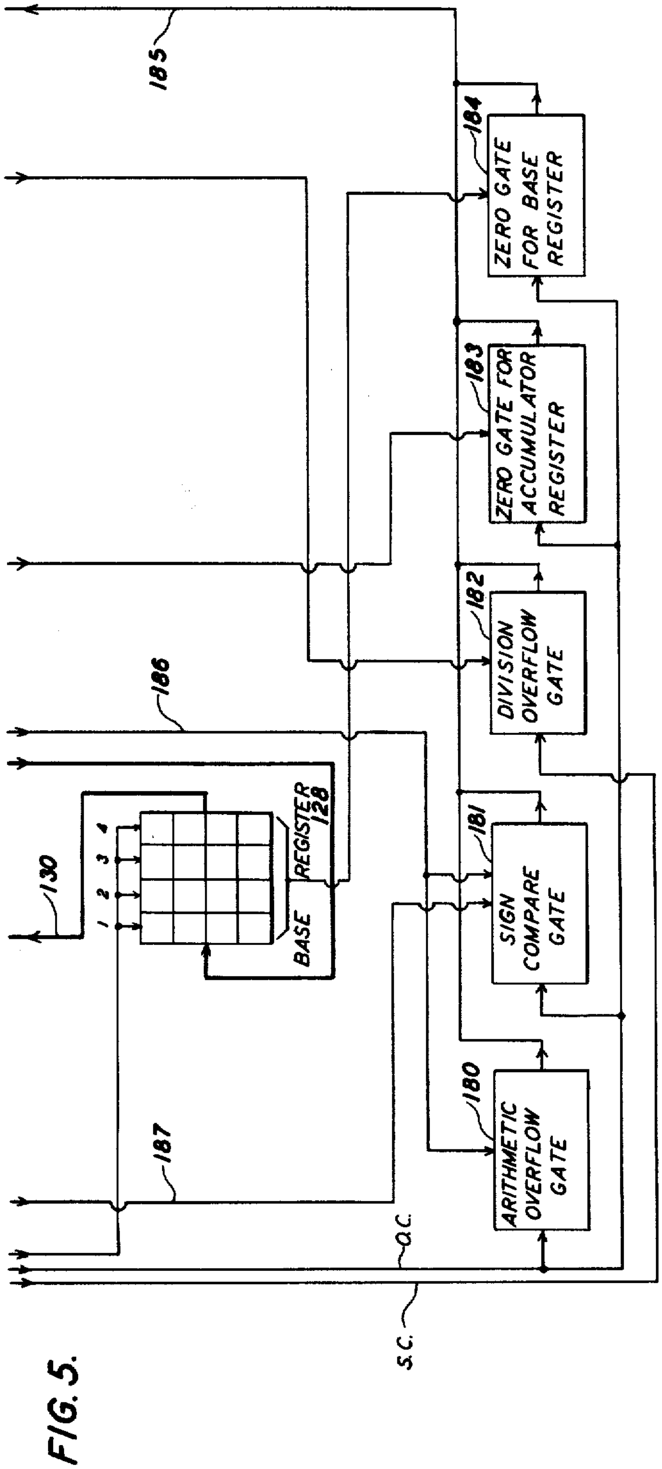

The command program and the operand upon which the commands are to be carried out are introduced to the computer by a source 10 which may be any suitable arrangement for entering digital information in code form. This digital information is transferred through the computer circuits 12 which serve to convey the digital information to memory circuits 14. The computer circuits 12 also serve to execute the commands which are subsequently fetched. In FIG. 1 the computer circuits 12 are indicated as a single block for the purpose of illustrating the general application of the control apparatus for the invention. One complete form of computer circuits is shown in FIGS. 4 and 5.

The memory circuits 14 comprise a suitable storage medium such as a rotating magnetic drum, and gate circuits for permitting numerical information to be transferred to or from the storage medium.

The individual commands and operands are stored in cells or addresses in the memory circuits, and the individual cells or addresses are numbered in order to designate the locations of the information which is stored.

The information in the individual cells is selected for use in computations by an address register 16. The address register comprises four columns of bi-stable circuits with each column having four bi-stable circuits arranged to register one digit in accordance with the binary code of Table 1. The columns of bi-stable circuits are coupled so that the registration in one column may be shifted into the toggles forming an adjacent column. Thus, digital information may be registered by introducing a binary-coded digit into an end column and thereafter shifting that registration along the columns of the register until the desired digits are registered in the columns of the register.

An order register 18 is coupled to the input of the address register 16, so that the order portion of a multi-digit command may be registered in the register 18 and the address portion of the command may be registered in the register 16. The order register is similar to the address register but it has only two columns in the embodiment illustrated.

The order and address registers are arranged to register commands having two digits in the order portion and having four digits in the address portion. It will be apparent that the apparatus may be arranged to register commands having a different number of digits if desired.

The four columns of the address register are coupled to the memory circuits by four circuits 20, and they serve to condition gating circuits to effect the selection of commands and operands at the respective addresses which are registered in the address register. The address register serves to alternately register the address of each command which is to be fetched and the address portions of the respective commands which are fetched. The respective commands are fetched to the order and address registers over a link 21.

A command counter register 22 serves to transfer to the address register the successive addresses of the commands which are to be fetched. The fourth column of the address register is coupled by a link 24 to the first column of the command counter register so that information in the address register may be shifted into the command counter register. The fourth column of the command counter register is coupled to the first column of the address register by a link 26 so that information in the command counter register may be shifted into the address register.

The command counter register is provided with means such as manually operated knobs 28 for initially entering an address in the command counter register, and the initial address may be shifted over the link 26 into the address register. The command counter is arranged to register the address which is shifted into it from the address register or to provide a registration of the address which is shifted into it from the address register and increase its numerical value by one. A command counter control circuit 30 determines whether or not the command counter counts up or merely registers each time that an address is shifted into it.

A source 32 of shift pulses serves to provide pulses for shifting information along the order register, the address register, and the command counter register. These shift pulses from the source 32 are applied through shift control gates 34 to the respective registers. The gates themselves are operated under the control of pulses which are provided by the computer circuits over the leads labeled TP–1, TP–4, and TP–$\mathbf{5}_{C1}$.

A sensing circuit 36 serves to sense a certain condition within the computer, and it serves to set a bi-stable toggle 38 to its "1" state if the condition occurs. The bi-stable toggle 38 is normally set to its zero state by a switch 40.

Four gates and pulse generators 41 to 44 are controlled by the condition of the bi-stable toggle 38 and by an order matrix 46. The order matrix sets up voltage levels on the bracketed output leads in accordance with the order portion of the command registered in the order register 18. The gates and pulse generators 41 to 44 control the operation of the computer, and they may transfer the operation of the computer from one sequence of commands to a different sequence of commands when a selected condition is sensed by the sensing circuit. An alarm 48 is coupled to the output of the gate and pulse generator 41 and it serves to provide an alarm when certain conditions are sensed in the computer circuits.

In operation, the commands and operands are introduced into the computer from the source 10 and they are stored in the memory circuits 14.

The address of the first command which is to be fetched is initially set in the command counter register. At the beginning of the first fetch cycle of operation, a TP–1 pulse is applied from the computer circuits to the shift control gates 34, and it turns on the gates 34B and 34C to pass a series of shift pulses which cause the contents of the command counter register to be shifted over the link 26 into the address register. The information in the address register causes the memory circuits to read the command at the address which is registered in the address register. This command is transferred to the order and address registers over the link 21 in response to a TP–4 pulse which turns on the gates 34A, 34B and 34C. When the command is shifted into the order and address registers, the old address is shifted over the link 24 into the command counter register. The TP–4 pulse enables the command counter control circuits 30 to cause the command counter register to increase the numerical value of the address by one.

The command which is in the order and address register is now ready for execution, and the execute cycle is initiated by a TP–5 pulse from the computer circuits. This pulse is applied to the four gate and pulse generators 41 to 44 and the operation of the computer during the execute cycle is determined by which one of the four gate and pulse generators is conditioned to provide an output pulse in response to the TP–5 pulse.

If a selected condition was not sensed by the sensing circuit 36 during the execution of the preceding order and if the order portion of the command relates to an operation which is to be performed on an operand, the order matrix 46 and the zero state of the bi-stable toggle 38 condition only the operand gate and pulse generator 43 to pass a pulse. This gate and pulse generator provides a TP–5*c*2 pulse which causes the memory circuits to read the operand which is at the address registered in the address register and thereafter an arithmetic computation is performed on the operand in accordance with the order in the order register.

If the order portion of the command is a conditional transfer order, the computer will either ignore the conditional transfer order or it will change from one sequence of commands to a different sequence of commands, depending upon the condition of the bi-stable toggle 38.

If a conditional transfer order is registered in the order register, and the selected condition was not sensed by the sensing circuit 36 during the execution of the preceding order so that the bi-stable toggle 38 remains in its zero state, the ignore gate and pulse generator 44 emits a TP–5*b* pulse in response to the TP–5 pulse from the computer. This TP–5*b* pulse causes the computer circuits to ignore the command which is in the order and address register so that the computer fetches the next command in numerical order.

If a conditional transfer order is registered in the order register, and if the selected condition was sensed by the sensing circuit 36 during the execution of the preceding order so that the bi-stable toggle 38 is set to its "1" state, the bi-stable toggle 38 and the order matrix 46 condition the no-operand gate and pulse generator 42 to pass a TP–5*c*1 pulse in response to the TP–5 pulse produced by the computer. This TP–5*c*1 pulse turns on the shift control gates 34B and 34C so that the address portion of the command is shifted from the address register into the command counter register. This address is not increased by one because a pulse is not applied to the command counter control circuits 30 at this time.

At the beginning of the next fetch cycle, a TP–1 pulse causes the address which is registered in the command counter register to be shifted into the address register so that the address now registered in the address register is the address portion of the previously fetched command.

Thus, the address register and the command counter register ordinarily cause the addresses of the commands which are to be fetched to increase in numerical order. However, if the order matrix 46 and the bi-stable toggle 38 condition the no-operand gate and pulse generator 42 so that a TP–5*c*1 pulse is emitted, the normal sequence of operation is interrupted and the address of the last command is shifted into the command counter register and back into the address register so that the next command to be fetched is the command at the address designated by the address portion of the last previous command; i.e., the conditional transfer order.

If the selected condition was sensed by the sensing circuit 36 during the execution of the preceding order so that the bi-stable toggle 38 is caused to be in its "1" state and the order portion of the command is not a conditional transfer order, the order matrix 46 and the bi-stable toggle 38 will condition the alarm gate and pulse generator 41 to emit a TP–5*a* pulse in response to the TP–5 pulse from the computer circuit. This indicates that conditions existing within the computer require that the commands change from one sequence to a different sequence. This may be termed an unanticipated overflow. However, if a conditional transfer order was not present in the order register so as to condition the no-operand gate and pulse generator 42 to emit a TP–5*c*1 pulse, the operation of the computer should be halted so as to permit the operator to correct this situation. The TP–5*a* pulse which is emitted by the alarm gate and pulse generator 41 is applied to an alarm circuit 48 which calls the operator's attention to the situation in the computer. The TP–5*a* pulse may be applied to the computer circuits 12 so as to halt the operation of the computer.

Thus, the order matrix 46 provides a gating voltage level on the four bracketed leads, two at a time: on the two leads running to the gate and pulse generators 42 and 4 when a conditional transfer order is registered in the order register 18; and on the two leads running to the gate and pulse generators 41 and 43 when a conditional transfer order is not registered in the order register. Then, depending upon the condition of bi-stable toggle 38, a particular one of the four gate and pulse generators 41 to 44 will have a coincidence of gating voltage levels applied to it, one from the order matrix 46 and the other from the bi-stable toggle 38. This particular gate and pulse generator will then be conditioned to generate a pulse upon receipt of TP–5 pulse from the computer. Conventionally, each of the gate and pulse generators 41 to 44 may comprise a coincidence gate through which the TP–5 pulse passes to fire a blocking oscillator.

Figure 3:
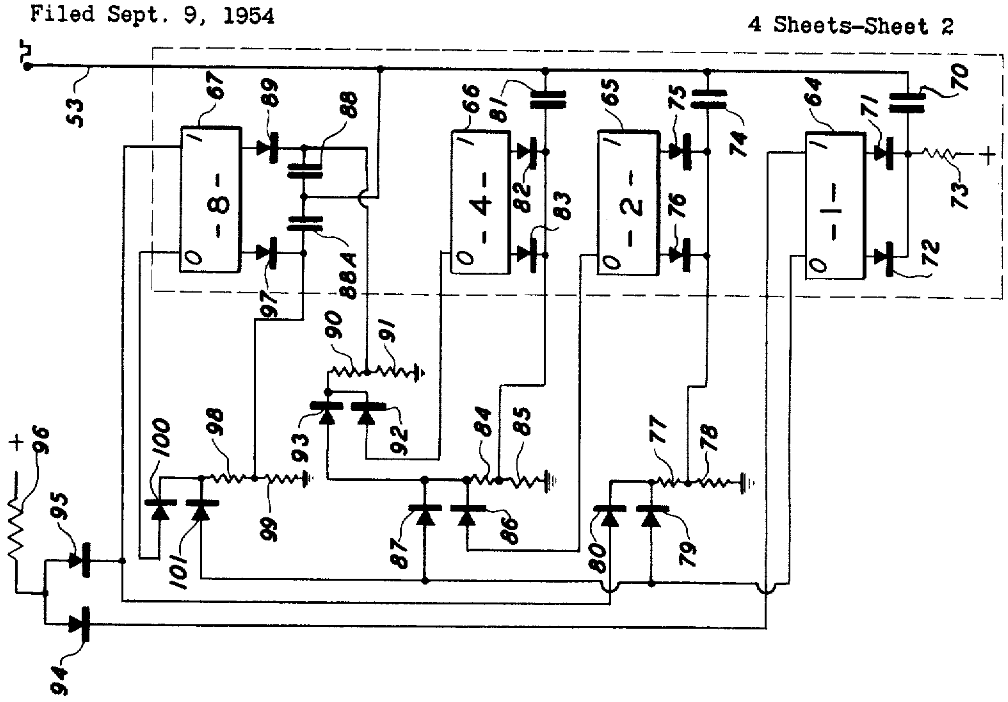
FIG. 3 is a circuit diagram showing the circuit arrangement for the input column of the command counter of FIG. 1.
Figure 2:
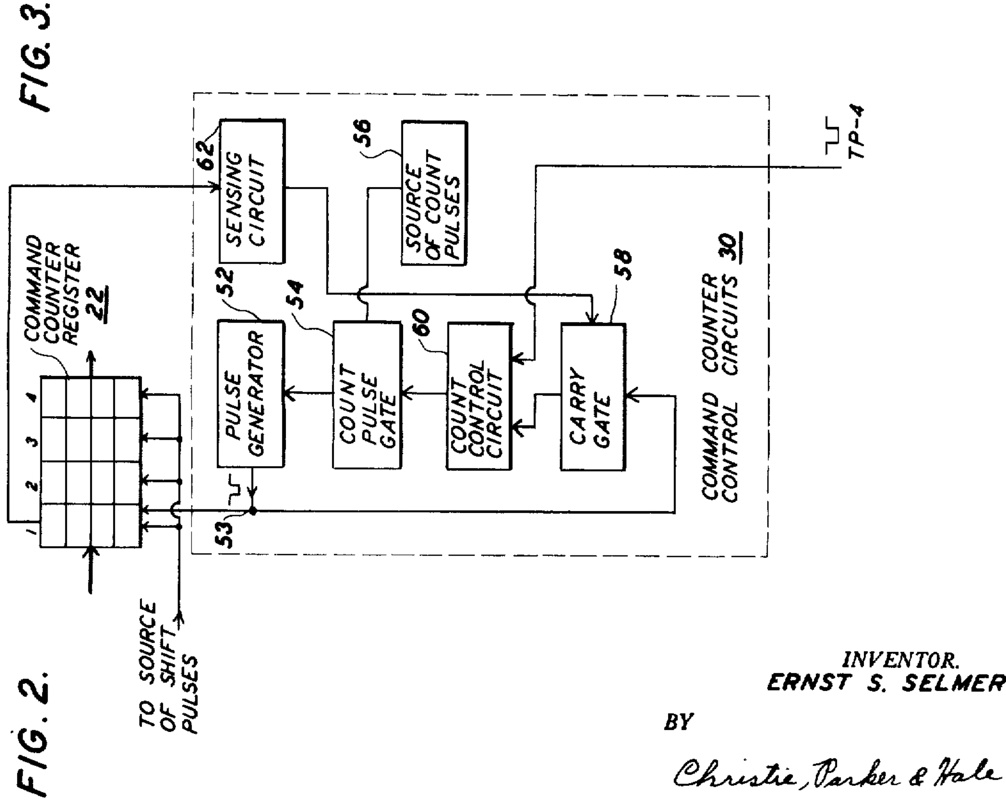
FIG. 2 is a block diagram showing the command counter control circuits which are illustrated as a block in FIG. 1.

FIGS. 2 and 3 show one suitable arrangement for the command counter register and for the command counter control circuits which are shown in FIG. 1.

In FIG. 2 the command counter register 22 includes four columns of bi-stable circuits, each of which includes four bi-stable circuits. The bi-stable circuits of each column are adapted to register a binary-coded digit in the conventional 1–2–4–8 notation of Table I. The bi-stable circuits of each of the columns are connected to corresponding bi-stable circuits of an adjacent column so that a multiple digit number may be shifted along the register in response to the shift pulses.

The first column of the command counter register performs the counting operation. When the pulse generator 52 applies a pulse to the first column of the register, the circuit is arranged so that the registration in the column is increased by one count.

Assuming that the least significant digit of a multiple digit number is applied to the first column, the digit may be shifted and registered in the first column in response to one of the shift pulses. If a count operation is to be performed, a negative TP–4 pulse is applied to the command counter control circuits 30 by the computer circuits. This causes the count pulse gate 54 to open and a pulse from a source of count pulses 56 to be passed to the pulse generator 52.

In response to the count pulse, the count pulse generator 52 generates a pulse which is applied over the lead 53 to the first column of the command counter register 22 and to the carry gate 58. If the maximum allowable registration in each of the sets of the command counter register 22 is to be limited to nine, and the registration in the first column before the counting operation is any number other than nine, the carry gate 58 will pass the pulse generated by the pulse generator 52 to the count control circuit 60. In response to the pulse from the carry gate 58, the count control circuit 60 closes the count pulse gate 54, thereby inhibiting the passage of any succeeding count pulses from the source of count pulses 56 to the pulse generator 52.

However, if the registration in the first column before the count operation equals nine, a sensing circuit 62 supplies a signal which closes the carry gate 58 and the count control circuit 60 remains in that condition which maintains the count pulse gate 54 in open position. When the next succeeding digit of the multiple digit number is applied to the first column of the command counter register 22, a shift pulse causes the previous registration to be shifted to the second column, and the new digit to be registered in the first column. The next count pulse from the source of count pulses 56 is passed by the count pulse gate 54 to the pulse generator 52, which in turn energizes the counting circuit associated with the first column. If before the pulse is applied by the pulse generator 52 the registration in the first column is any number other than nine, the pulse from the pulse generator 52 is passed to the count control circuit 60 by the carry gate 58, causing the count control circuit 60 to close the count pulse gate 54.

FIG. 3 shows one type of counting interconnection circuit for use with the first column of the command counter register 22 of FIG. 2. The column of FIG. 3 includes a binary –1– registering circuit 64, a binary –2– registering circuit 65, a binary –4– registering circuit 66 and a binary –8– registering circuit 67.

It will be assumed that when a bi-stable circuit is in its "0" condition, a relatively high potential is provided from the "0" side of the bi-stable circuit, and a relatively low potential is provided from the "1" side of the bi-stable circuit. In like manner, it will be assumed that when a bi-stable circuit is in its "1" condition, a relatively high potential is provided from the "1" side of the bi-stable circuit, while a relatively low potential is provided from the "0" side of the bi-stable circuit.

Assuming that the binary number registering circuits 64 to 67 are all in their "0" condition of operation, a negative going counting pulse applied to the lead 53 will be passed to the "1" side of the binary –1– registering circuit via the capacitor 70 and a diode 71. A suitable threshold potential for maintaining the diode 71 and the diode 72 in non-conducting condition, except when a negative going counting pulse appears, may be provided by means of a resistor 73 which is connected serially between the diodes 71 and 72 and a suitable source of positive potential (not shown). The number one, therefore, is registered in the bi-stable circuits by the binary –1– registering circuit being in its "1" condition.

When the number one is registered in the column, a negative going counting pulse applied to the lead 53 is passed to the "0" side of the binary –1– registering circuit via the capacitor 70 and the diode 72. This causes the binary –1– registering circuit to resume its "0" condition. The negative going counting pulse also is applied to the "1" side of the binary –2– registering circuit 65 via a capacitor 74 and a diode 75. The threshold potential for the diodes 75 and 76 is derived from an intermediate point on a voltage divider comprising the resistors 77 and 78. The potential across the voltage divider, including the resistors 77 and 78, is determined in part by the voltage on the "0" side of the binary –1– registering circuit 64 via a diode 79, and in part by the voltage appearing on the "1" side of the binary –8– registering circuit 67 via a diode 80. When the voltage from both the "0" side of the binary –1– registering circuit 64 and the voltage from the "1" side of the binary –8– registering circuit 67 are at a relatively low potential, the threshold on the diodes 75 and 76 will be of a value which will allow the negative going counting pulse to be passed to the binary –2– registering circuit 65.

When the potential on the "0" side of the binary –1– registering circuit 64 is relatively low just prior to the counting pulse, and a counting pulse is applied to the lead 53, the binary –2– registering circuit 65 is placed in the "1" condition and the binary –1– registering circuit 64 is placed in the "0" condition. Therefore, the number two is registered in the column by the binary –2– registering circuit 65. When the column registers the number two and a negative going counting pulse is applied to the lead 53, the binary –1– registering circuit 64 is placed in its "1" condition of operation. This means that the number three is registered by the binary –2– registering circuit 65 and the binary –1– registering circuit 64 being in the "1" condition.

When the column registers the number three and a counting pulse applied to the lead 53 is passed to the "0"

side of the binary –1– registering circuit 64, the circuit is returned to its "0" condition, and since the potential derived from the "0" side of the binary –1– registering circuit 64 prior to the fourth counting pulse is relatively low, the counting pulse is passed to the "0" side of the binary –2– registering circuit 65 via the diode 76. In addition, the counting pulse is passed to the "1" side of the binary –4– registering circuit 66 via a capacitor 81 and a diode 82. The threshold potential on the diode 82 and a diode 83 is derived from a voltage divider comprising the resistors 84 and 85. The voltage across the voltage divider of the resistors 84 and 85 is determined in part by the potential on the "0" side of the binary –2– registering circuit 65 via a diode 86, and in part by the voltage apeparing on the "0" side of the binary –1– registering circuit 64 via a diode 87.

When either the voltage on the "0" side of the binary –1– registering circuit 64, or the voltage on the "0" side of the binary –2– registering circuit 65 is at a high potential, the threshold voltage on the diodes 82 and 83 inhibits the passage of any counting pulses to the binary –4– registering circuit 66. Before the counting pulse is received, both the "0" side of the binary –2– registering circuit 65 and the "0" side of the binary –1– registering circuit 64 are at a relatively low potential. This results in a threshold potential on the diodes 82 and 83 which allows the fourth counting pulse to be passed to the "1" side of the binary –4– registering circuit 66 via the diode 82. Therefore, the number four is registered in the column by the binary –4– registering circuit 66 being in its "1" condition, the binary –2– registering circuit 65 being in its "0" condition, and the binary –1– registering circuit 64 being in its "0" condition.

When the column registers the number four and a counting pulse is applied to the lead 53, the binary –1– registering circuit 64 assumes its "1" condition. Therefore, the count of five is registered by the binary –4– registering circuit 66 being in its "1" condition and the binary –1– registering circuit 64 being in its "1" condition, while the binary –2– registering circuit 65 and the binary –8– registering circuit 67 remain in the "0" condition.

When the number five is registered in the column and a counting pulse is applied to the lead 53, the binary –1– registering circuit 64 returns to its "0" condition and the pulse is passed to the "1" side of the binary –2– registering circuit 65, since the "0" side of the binary –1– registering circuit 64 was at a relatively low potential prior to the pulse and the "1" side of the binary –8– registering circuit 67 was at a relatively low potential. Therefore, the number six is registered in the column by the binary –4– reistering circuit 66 being in its "1" condition, the binary –2– registering circuit 65 being in its "1" condition, the binary –1– registering circuit 64 being in its "0" condition, and the binary –8– registering circuit 67 being in its "0" condition.

When the number six is registered in the column and a counting pulse is applied to the lead 53, the condition of the binary –2– registering circuit 65, the binary –4– registering circuit 66 and the binary –8– registering circuit 67 remains the same, but the binary –1– registering circuit 64 is changed to its "1" condition, thereby resulting in a registration of the number seven.

When the number seven is registered and a counting pulse is applied to the lead 53, the binary –1– registering circuit 64 is returned to its "0" condition. The binary –2– registering circuit 65 is returned to its "0" condition since the "0" side of the binary –1– registering circuit 64 was at a relatively low potential prior to the counting pulse and the "1" side of the binary –8– registering circuit 67 was at a low potential prior to the counting pulse.

In like manner, the binary –4– registering circuit 66 is returned to its "0" condition since the "0" side of the binary –1– registering circuit, and the "0" side of the binary -2- registering circuit 65 were at a relatively low potential prior to the counting pulse.

In addition, the counting pulse is passed to the "1" side of the binary -8- registering circuit via a capacitor 88 and a diode 89. The threshold on the diode 89 is determined by the potential at an intermediate point on a voltage divider comprising the resistors 90 and 91. The potential across the voltage divider of the resistors 90 and 91 is determined by the potential on the "0" side of the binary -4- registering circuit 66 via a diode 92, and the potential on the "0" sides of both the binary -2- registering circuit 65 and the binary -1- registering circuit 64 appearing across the voltage divider including the resistors 84 and 85. The potential appearing across the resistors 84 and 85 is applied to the voltage divider of the resistors 90 and 91 via a diode 93.

When the "0" side of any one of the binary digit registering circuits 64, 65 or 66 is at a relatively high potential, the diode 89 will be inhibited from passing count pulses to the "1" side of the binary -8- registering circuit 67. Since the previous registration in the column was such that the "0" sides of the binary number registering circuits 64, 65, and 66 were at a relatively low potential, the counting pulse is passed to the "1" side of the binary -8- registering circuit 67, thereby causing the binary -8- registering circuit to assume the "1" condition. Therefore, the number eight is registered in the column by the binary -4- registering circuit 66 being in its "0" condition, the binary -2- registering circuit 65 being in its "0" condition, and the binary -1- registering circuit 64 being in its "0" condition.

When the number 8 is registered in the column and the next counting pulse appears, the binary -8- registering circuit 67, the binary -4- registering circuit 66, and the binary -2- registering circuit 65 remain in their previous conditions of operation. However, the binary -1- registering circuit 64 is changed from its "0" condition of operation to its "1" condition. Thus, the number nine is registered in the column by the binary -8- registering circuit 67 being in its "1" condition, the binary -4- registering circuit 66 being in its "0" condition, the binary -2- registering circuit 65 being in its "0" condition and the binary -1- registering circuit 64 being in its "1" condition.

In order to provide a signal indicating that the number nine is registered in the column, a diode 94 is connected to the "1" side of the binary -1- registering circuit 64 and a diode 95 is connected to the "1" side of the binary -8- registering circuit 67. Since the only time when the binary -8- registering circuit 67 and the binary -1- registering circuit 64 are both in the "1" condition is when the number nine is registered, the voltage at the signal end of a resistor 96 assumes a relatively high potential when the number nine is registered. On the other hand, when either the binary -8- registering circuit 67 or the binary -1- registering circuit 64 is in its "0" condition, the voltage at the signal end of the resistor 96 will be a relatively low potential. Therefore, the diodes 94 and 95 and the resistor 96 provide one suitable sensing circuit for use with the apparatus of FIG. 2.

When the number nine is registered in the column, and the next counting pulse appears, the binary -1- registering circuit 64 is returned to its "0" condition, the binary -2- registering circuit 65 and the binary -4- registering circuit 66 remain in their "0" conditions, and the counting pulse is passed to the "0" side of the binary -8- registering circuit 67 via a capacitor 88A and a diode 97. The threshold potential on the diode 97 is determined in part by the potential at an intermediate point on a voltage divider comprising the resistors 98 and 99. The voltage across the voltage divider is determined in part by the potential on the "0" side of the binary -8- registering circuit 67 via a diode 100 and in part by the voltage appearing on the "0" side of the binary -1- registering circuit 64 via a diode 101.

When either the "0" side of binary -8- registering circuit 67 or the "0" side of the binary -1- registering circuit 64 is at a high potential, the diode 97 will be inhibited from passing count pulses to the "0" side of the binary -8- registering circuit 67. However, when the number nine is registered in the column, both the "0" side of the binary -8- registering circuit 67 and the "0" side of the binary -1- registering circuit 64 are at a relatively low potential, and the count pulse is passed to the "0" side of the binary -8- registering circuit 67, thereby causing it to assume its "0" condition. Therefore, when the number nine is registered in the column, a count pulse causes all of the binary number registering circuits 64 to 67 to assume their "0" conditions.

The apparatus of FIGS. 2 and 3 is disclosed and claimed in my co-pending application Serial No. 439,761, which was filed on June 28, 1954, and entitled "Counting Apparatus."

FIGS. 4 and 5 show the apparatus of FIG. 1 incorporated in one type digital computer. Digital information is introduced to the computer from the source 10 which is coupled to the sign column of a storage register 120. The digits are entered one by one until the storage register is filled, and then they are transferred to the accumulator register 122 through the adder 124. The adder receives digits one by one from the tenth column of the storage register and from either the tenth column of the accumulator register 122 over the link 126 or the fourth column of the base register 128 over the link 130, and it transfers the sum of these digits to the sign column of the accumlator register 122 from which they are shifted from left to right until the accumulator register is filled.

An auxiliary register 131 is coupled to the output of the accumulator register 122, and the tenth column of the auxiliary register is coupled to the sign column of the accumulator register 122 so that numerical information in the two registers may be circulated through them.

The auxiliary register 131 serves to store the least significant half of the product when two numbers are multiplied. It also holds the least significant half of the dividend before division occurs, and it holds the remainder afterwards.

A recorder 135 is coupled to the sign column of the accumulator register 122, and it may be employed to print out the successive digits which are shifted into the sign column.

To transfer information from the storage register to the accumulator register without alteration, zeros may be added from the accumulator register to the information which is transferred from the storage register to the adder so that the digits which are transferred from the adder to the accumulator register are the same as those which were present in the storage register.

In order to alter information which is transferred from the storage register through the adder the digits which are registered in the base register 128 may be added to the digits which are stored in columns 7 to 10 of the storage register as they are transferred through the adder.

The digital information in the accumulator register 122 is transferred through the link 132 and a memory control gating circuit 134 to a magnetic drum 136. The digital information is recorded magnetically on the drum by a plurality of transducers 138 so that it is located in a plurality of tracks 140 around the magnetic drum. In order to simplify this disclosure only four tranducers are illustrated. These transducers are sufficient for recording a single series of digits in binary code form in time parallel in the band of tracks 140 so as to record a series of digits in accordance with the code of Table I.

The information is recorded on the magnetic drum in specific cells with the number which is recorded in each of the cells having ten binary-coded decimal digits plus an indication of the sign of the number. The cells in which each group of ten digits may be recorded are identified by signals on a clock track 142 on the drum.

The individual addresses or cells on the magnetic drum are identified by a sector counter 144, which, in response to pulses derived from the clock track via a clock pulse generator 146, keeps step with the instantaneous position of the magnetic drum 136, thereby indicating the particular address or cell lying under the transducers 138.

The address of the first command to be executed is pre-set in the command counter circuits 148, and it is transferred through the link 26 to the address register 16 under the influence of shift pulses from the shift pulse generator 32. As soon as the address which is registered in the sector counter 144 is identical to the address registered in the address register 16, a sector coincidence circuit 150 emits a signal indicating that the desired address is under the transducers 138. This output signal enables the memory control gating circuit 134 to pass the command which is recorded at that address on the magnetic drum through the link 152 to the storage register 120.

The operation of the shift pulse generator 32 is synchronized with the movement of the magnetic drum by the clock pulses which are received over a lead 154.

Under the influence of pulses from the shift pulse generator 32, the command which is registered in the storage register 120 is shifted through the adder 124 and the link 21 into the address register 16 and the order register 18. Ordinarily, zeros are added to the command as it is shifted through the adder so that the command which is transferred to the address register 16 and the order register 18 for execution is the same as the command that was in the storage register 120.

The four digits which comprise the address portion of the command are registered in the address register, and the two digits which represent the order portion of the command are registered in the order register.

Each time a new address is shifted into the address register 16, the old address is transferred over the link 24 to the command counter circuits 148. As discussed above with reference to FIGS. 1 and 2, the command counter circuits count up one only in response to TP–4 pulses.

When the operand address which is registered in the address register and the address which is registered in the sector counter are the same, the sector coincidence circuit 150 and the memory control gating circuit 134 cause the operand to be transferred over the link 152 to the storage register 120.

The particular type of computation to be made with respect to the operand is determined by the numerical registration in the order register 18. An order matrix 46 is coupled to the order register, and it serves to provide an output which distinguishes the respective orders.

Arithmetic control circuits 156 are coupled between the order matrix 46 and the adder 124. They cause the adder to perform the arithmetic computation which is designated by the order matrix. The adder causes digits to be added to or subtracted from the operand which is in the storage register, and the result of the computation is transferred to the accumulator register 122. The information in the accumulator register may be employed in subsequent computations or it may be read out by means of a suitable print-out arrangement.

After the operand has been transferred to the storage register and the arithmetic computations have been effected, the address of the next succeeding operand or command is shifted from the command counter into the address register. Then the above-described cycle of operations may be repeated under the control of the information which is registered in the order register and in the address register.

The fetch and execute cycles of operation of the computer include a number of separate and distinct operations. In the computer illustrated, these operations are performed in accordance with seven timing pulses as follows:

TP–1 Shift command address from command counter to address register.

TP–2 Set memory control gating circuits to read the command at the address indicated in the address register.

TP–3 Transfer the command from the magnetic memory drum to the storage register.

TP–4 Transfer the command from the storage register to the order and address registers.

TP–5 Set memory control gating circuits to read the operand which is at the address registered in the address register.

TP–6 Transfer this operand from the magnetic memory drum to the storage register.

TP–7 Perform the arithmetic computation in accordance with the order in the order register.

The TP–1 to TP–4 pulses comprise the fetch cycle of operation, and the TP–5 to TP–7 pulses comprise the execute cycle of operation. An operation complete (OC) pulse is produced by the arithmetic control circuits at the end of the fetch cycle and also at the end of the execute cycle of operation.

In the computer illustrated, the cycles of operation are controlled by an operation control circuit 158 which is a bi-stable circuit arranged to open and close a fetch gate 160 and an execute gate 162 alternately in accordance with the condition of the bi-stable control circuit 158. These two gates are coupled to a fetch pulse generator 164 and an execute pulse generator 166 which serve to provide the TP–1 and TP–5 pulses. The fetch pulse generator 164 is provided with a switch 168 for actuating the generator to cause it to produce a TP–1 pulse.

With respect to the series of timing pulses which are employed to control the operation of the computer, the fetching operation is initiated by the fetch pulse generator 164 providing a fetch pulse TP–1. When the operation of the computer is first initiated, the initial pulse TP–1 may be generated by actuating the switch 168 of the fetch pulse generator 164. This fetch pulse is applied to the shift control gates 34 and to the operation control circuit 158. The pulse which is applied to the operation control circuit 158 changes its bi-stable condition so as to open the execute gate 162 and close the fetch gate 160.

The fetch pulse TP–1 causes the shift control gates 34 to shift an address from the command counter circuits 148 into the address register 16. At the conclusion of this operation, a TP–2 pulse is generated by the shift pulse generator 32 and applied to the memory control gating circuit 134 to enable a command to be derived from the magnetic drum 136 when a sector coincidence pulse TP–3 is provided by the sector coincidence circuit 150. The sector coincidence pulse TP–3 causes the command to be read from the drum to the storage register 120.

At the completion of this operation a TP–4 pulse is generated by the memory control gating circuit 134, and this pulse causes the shift pulse generator 32 and the shift control gates 34 to shift the command from the storage register 120 to the order register 18 and the address register 16.

This completes the fetching operation, and at this time an operation complete (OC) pulse is provided by the arithmetic control circuits 156 in response to a signal over the lead 170 from the shift pulse generator 32. The operation complete (OC) pulse is applied to the fetch gate 160 and to the execute gate 162. Since the fetch gate is closed and the execute gate is open due to the potentials provided by the operation control circuit 158, the operation complete (OC) pulse is conveyed through the execute gate to cause the execute pulse generator 166 to generate an execute pulse TP–5. This pulse is applied to the four gate and pulse generators 41 to 44, and also to the operation control circuit 158 so as to close the execute gate 162 and to open the fetch gate 160.

In the normal sequence of operations the operand gate and pulse generator 43 is conditioned to respond to the TP–5 pulse, and it produces a TP–5*c*2 pulse which causes the memory control gating circuit 134 to read an operand, since the address register 16 now contains the address of an operand which is to be transferred to the storage register 120. The sector coincidence circuit 150 emits a coincidence pulse TP–6 which actuates the memory control gating circuit 134 to read the desired operand from the magnetic drum over the link 152 into the storage register 120. As before, the binary-coded decimal digits of the operand, appearing digit after digit, are shifted into the storage register by shift pulses which are derived from the shift pulse generator 32.

At the completion of this operation, a TP–7 pulse from the memory control gating circuit 134 is applied to the arithmetic control circuits 156 for initiating the arithmetic computation which is designated by the order which is registered in the order register 18.

At the completion of the arithmetic computation an operation complete (OC) pulse is emitted by the arithmetic control circuits 156 to indicate the completion of the execution operation. This pulse is applied to the fetch gate 160 and the execute gate 162. Since the execute gate is closed and the fetch gate is open, the pulse is conveyed through the fetch gate to cause the fetch pulse generator to generate the next fetch pulse TP–1 so as to initiate another fetching operation.

The cycle then repeats itself with the fetching of a command, the registration of that command in the order register 18 and the address register 16, and the execution of the command.

Due to the action of the address register and the command counter circuits, the addresses of commands to be executed ordinarily increases in numerical order so that the computer follows one sequence of commands in which the addresses increase in numerical order.

However, in response to conditions which occur within the computer circuits, the bi-stable toggle 38 and the order matrix 46 may alter this sequence of operations by disabling the operand gate and pulse generator 43 and by enabling one of the other three gate and pulse generators 41, 42 or 44 to provide an output pulse in response to the TP–5 pulse.

If a conditional transfer order is registered in the order register and the bi-stable toggle 38 remains in its zero state, the ignore gate and pulse generator 44 will emit a TP–5*b* pulse in response to the TP–5 pulse. This TP–5*b* pulse is applied to the fetch and execute gates 160 and 162 in the same manner as an OC pulse. Since the execute gate is closed by the operation control circuit in response to the TP–5 pulse, the TP–5*b* pulse is conveyed through the fetch gate 160 to the fetch pulse generator which emits a TP–1 pulse. This TP–1 pulse initiates the next fetch cycle. Thus, the TP–5*b* pulse causes the computer circuits to ignore the command which is in the order and address register so that the computer fetches the next command in numerical order.

If a conditional transfer order is registered in the order register, and if the bi-stable toggle 38 is set to its "1" state, the bi-stable toggle 38 and the matrix 46 condition the no-operand gate and pulse generator 42 to pass a TP–5*c*1 pulse in response to the TP–5 pulse produced by the computer. This TP–5*c*1 pulse is applied to the shift control gates 34 which cause the address portion of the command to be shifted from the address register into the command counter register. This address is not increased by one because no TP–4 pulse is applied to the command counter circuits at this time. The TP–5*c*1 pulse also causes the shift control gates 34 to pass a pulse to the fetch and execute gates, whereupon the fetch cycle is initiated. At the beginning of the next fetch cycle, a TP–1 pulse causes the address which is registered in the command counter register to be shifted into the address register so that the address now registered in the address register is the address portion of the previously fetched command.

Thus, if certain conditions exist within the computer, the no-operand gate and pulse generator 42 is caused to emit a TP–5*c*1 pulse which in turn causes the normal sequence of operation of the computer to be interrupted so that the next command to be fetched is the command at the address designated by the address portion of the last previous command.

If the bi-stable toggle 38 is caused to be in its "1" state and the order portion of the command is not a conditional transfer order, the order matrix 46 and the bi-stable toggle 38 will condition the alarm gate and pulse generator 41 to emit a TP–5*a* pulse in response to the TP–5 pulse. This indicates that conditions existing within the computer require that the commands change from one sequence to a different sequence of commands. However, since a conditional transfer order was not present in the order register so as to condition the no-operand gate and pulse generator 42 to emit a TP–5*c*1 pulse, the operation of the computer should be halted so as to permit the operator to correct this situation. The TP–5*a* pulse is applied to an alarm circuit 48 which calls the operator's attention to the situation in the computer. The TP–5*a* pulse may be employed to halt the operation of the computer.

The condition of the bi-stable toggle 38 is controlled by five sensing arrangements 180 to 184. When one of these sensing arrangements provides an output signal it is applied over the lead 185 to set the bi-stable toggle 38 to its "1" state.

The arithmetic overflow gate 180 is coupled to the sign column of the accumulator register 122 by a lead 186. This gate receives OC pulses from the arithmetic control circuits and it provides an output pulse over the lead 185 to the bi-stable toggle 38 if the numerical information in the accumulator register 122 has overflowed into the sign column of the register. Thus, it may be called a coincidence gate. Normally, decimal numbers having numerical value less than one are registered in the accumulator register 122. If, as a result of an arithmetic operation, a number greater than zero is registered in the sign column of the accumulator register 122, this indicates that there has been an arithmetic overflow in that the registered number is equal to or greater than one. If such is the case, then it is usually necessary that the computer be prevented from going on to the next command which is located in the next address in numerical order. The computer should change from the sequence that it has been following to a different sequence of commands which serves to convert the operation so that computations are effected on numbers of absolute value less than one.

When arithmetic overflow occurs, the arithmetic overflow gate 180 causes the bi-stable toggle 38 to be in its "1" state. If a conditional transfer order is registered in the order register 18, the no-operand gate and pulse generator 42 emits a TP–5*c*1 pulse, which causes the computer to change to another sequence of commands.

If a conditional transfer order was not registered in the order register 18, the bi-stable toggle 38 would cause the alarm gate pulse generator 41 to emit a TP–5*a* pulse which calls the operator's attention to the condition within the computer.

By way of example, if two numbers are added together and this operation is followed by an overflow in the accumulator register and by a conditional transfer command, the command program might be as follows:

*Table II*

COMMAND

| Cell | Order Portion | Address Portion |
|---|---|---|
| 0011 | 64 | 0250 |
| 0012 | 74 | 0251 |
| 0013 | 28 | 0269 |
| 0269 | 03 | 0310 |

where the command in cell 0011 orders that the operand in cell 0250 be fetched to the accumulator register. The command in cell 0012 orders that the operand in cell 0251 be added to the contents of the accumulator register. The command in cell 0013 is a conditional transfer order since an overflow was anticipated and orders that the command at address 0269 be fetched next if there has been an arithmetic overflow in the accumulator register. The command in cell 0269 orders that action appropriate to the overflow situation be initiated. In this case the action is to take the number from cell 0310 and print it out. This number might be the value of a certain variable at which overflow occurred, if, for example, a series of calculations were being made with different trial values of that variable.

After the printing a new series of calculations might be started with a modified value for some second variable.

The sequence of operation in the order register, the address register, and the command counter register would be as follows:

*Table III*

| After Pulse | Order Reg. | Address Reg. | Command Counter Reg. |
|---|---|---|---|
| TP-1 | 00 | 0011 | 0000 |
| TP-4 | 64 | 0250 | 0012 |
| TP-1 | 64 | 0012 | 0012 |
| TP-4 | 74 | 0251 | 0013 |
| TP-1 | 74 | 0013 | 0013 |
| TP-4 | 28 | 0269 | 0014 |
| TP-5c1 | 28 | 0014 | 0269 |
| TP-1 | 28 | 0269 | 0000 |
| TP-4 | 03 | 0310 | 0270 |

The sign compare gate 181 is coupled to the sign column of the acumulator register 122 by the lead 186 and it is coupled to the sign column of the storage register by the lead 187. The sign compare gate functions in response to an OC pulse from the arithmetic control circuits, and it serves to provide an output signal when the two signs are different.

The division overflow gate 182 responds to a subtraction complete (SC) pulse from the arithmetic control circuits. This pulse occurs between a TP–7 and an OC pulse. The division overflow gate 182 is coupled to the tenth column of the auxiliary register 131 and it serves to provide an output pulse when the number 10 is registered in the tenth column of the auxiliary register 131.

The auxiliary register 131 is arranged to shift the digits which it registers to the left one column after each trial subtraction. The tenth column of the auxiliary register 131 counts the number of times that the divisor has been trial subtracted from the dividend. If the tenth column of the auxiliary register counts to the number 10, this indicates that divisor is equal to or less than the dividend in the accumulator register, and the division overflow gate 182 should then cause the bi-stable toggle 38 to be set to its "1" state. Thus, the division overflow gate 182 provides an output pulse when a division has been ordered whose quotient is larger than 9,999,999,999. In effect the division overflow gate 182 serves to provide an output pulse when it has been found, by counting subtractions in the tenth column of the auxiliary register, that 1,000,000,000 times the divisor can be subtracted from the dividend ten times and still leave a non-negative remainder.

The zero gate 183 for the accumulator register responds to an OC pulse from the computer circuits. The zero gate 183 is coupled to the accumulator register and it serves to provide an output signal when all of the digits in the accumulator register are equal to zero.

The zero gate 184 for the base register responds to an OC pulse from the computer circuits. The zero gate 184 for the base register is coupled to the base register 123 and it serves to provide an output signal upon receipt of an OC pulse when the contents of not all of the columns of the base register equals zero. Thus the zero gate 184 may be termed a coincidence gate. It is important to be able to determine when the contents of the base register reaches a predetermined value such as zero. For example, by suitable programming, a number may be entered into the base register and the value of the number diminished by one each time the computer finishes executing the commands of a sub-program. In this fashion, the base register may be employed to cause the computer to re-execute a series of commands a predetermined number of times, i.e., until the registration in the base register is reduced to zero.

The apparatus of FIGS. 4 and 5 illustrate various ways in which the sensing circuit 36 of the apparatus of FIG. 1 may be employed to control the operation of the computer. It will be apparent that other sensing arrangements may be employed instead of the circuits 180 to 184 if desired.

I claim:

1. In a digital computer including an internal storage means for storing a program comprising preselected commands and information to be operated on at predetermined addresses in the storage means, each command specifying an operation to be executed and an address in the storage means of the information to be fetched upon which the operation is to be executed, the operations to be executed including arithmetic operations having successive address portions and conditional transfer operations having an address portion for changing the sequence of the successive addresses of the commands being executed, the conditional transfer commands being arranged in the stored program after a command which it is anticipated will produce an overflow in a preselected register, an order-address register, means for successively fetching the commands at sequential addresses in said storage means and storing them in the order-address register, means coupled to said fetching means to be responsive to a completed fetching operation for executing the command in the order-address register and to initiate the next fetching operation, at least a single preselected storage register adapted to indicate an overflow indicative of a preselected condition within the computer of an executed command, an overflow control element switchable between a non-overflow and an overflow condition and normally arranged in the first condition, means for sensing said storage register indicating an overflow and coupled to said control element to place said control element in the overflow condition upon sensing an overflow, and control means coincidentally responsive to the two conditions of said control element and to a signal from said executing means representative of a fetched conditional transfer command and operative to cause the computer to ignore the conditional transfer command or to next fetch the command at the address accompanying the conditional transfer command.

2. In a digital computer as defined in claim 1 wherein said control means comprises first control means coincidentally responsive to the overflow condition of said control element and to a signal from said executing means representative of a fetched conditional transfer command and operative upon such coincidence to cause the fetching means to then fetch the command at the address accompanying the condition transfer order and second control means coincidentally responsive to the non-overflow condition of said control element and a signal from said executing means representative of a fetched conditional transfer command and operative upon such coincidence to cause the executing means to ignore the conditional transfer order and to fetch the command at the next sequential address in said storage means.

3. In a digital computer as defined in claim 2 including a third control means coincidentally responsive to the overflow condition of said control element and to a signal from said executing means representative of a fetched command other than a conditional transfer command and operative upon such coincidence to halt the computer.

4. In a digital computer as defined in claim 3 wherein said third control means is operative to actuate an alarm upon the occurrence of said coincidence.

5. In a digital computer as defined in claim 2 including a third control means coincidentally responsive to the non-overflow condition of said control element and to a signal from said executing means representative of a fetched command other than a conditional transfer command and operative upon such coincidence to allow the executing means to complete the commanded executing operation.

6. In a digital computer operating as a fixed decimal point machine including an internal storage means for storing a program comprising preselected commands and information to be operated on stored at predetermined addresses, each command specifying an operation to be executed and an address in the storage means of the information to be fetched upon which the operation is to be executed, the operations to be executed including arithmetic operations having successive address portions and conditional transfer operations having an address portion for changing the sequence of the successive addresses of the commands being executed, the conditional transfer commands being arranged in the stored program after a command which it is anticipated will produce an overflow, a command-address register, means for successively fetching the commands at sequential addresses in said storage means and storing them in the command-address register, a storage register having a preselected capacity capable of being set to indicate an overflow beyond the fixed decimal point, means coupled to said fetching means to be responsive to a completed fetching operation for executing the command in the command-address register and to initiate the next fetching operation, an overflow control element switchable between a non-overflow and an overflow condition and normally arranged in the non-overflow condition, means for sensing said storage register for an overflow and coupled to said control element to place said control element in the overflow condition after an executed command has been sensed to overflow, first control means coincidentally responsive to the overflow condition of said control element and to a signal from said executing means representative of a fetched conditional transfer command and operative upon such coincidence to cause the fetching means to then fetch the command at the address accompanying the conditional transfer order, and second control means coincidentally responsive to a non-overflow condition of said control element and a signal from said executing means representative of a fetched conditional transfer command and operative upon such coincidence to cause the executing means to ignore the conditional transfer order and to fetch the command at the next sequential address in said storage means.

7. In a digital computer as defined in claim 6 including a third control means coincidentally responsive to the overflow condition of said control element and to a signal from said executing means representative of a fetched command other than a conditional transfer command and operative upon such coincidence to halt the computer.

8. In a digital computer as defined in claim 7 wherein said third control means is operative to actuate an alarm upon the occurrence of said coincidence.

9. In a digital computer as defined in claim 6 including a third control means coincidentally responsive to the non-overflow condition of said control element and to a signal from said executing means representative of a fetched command other than a conditional transfer command and operative upon such coincidence to allow the executing means to complete the commanded executing operation.

10. In a digital computer including an internal storage means for storing a program comprising preselected commands and information to be operated on stored at predetermined addresses, each command specifying an operation to be executed and an address in the storage means of the information to be fetched upon which the operation is to be executed, the operations to be executed including arithmetic operations having successive addresses and conditional transfer operations having an address portion for changing to a different sequence of successive addresses for the arithmetic operations to be executed, the conditional transfer commands being arranged in the stored program after an arithmetic command which it is anticipated will produce an overflow upon being executed, a command-address register, means for successively fetching the commands at sequential addresses in said storage means and storing them in the command-address register, means coupled to said fetching means to be responsive to a completed fetching operation for executing the command in the command-address register and to initiate the next fetching operation, a result storage register having a preselected result capacity and storage register capacity capable of being set for indicating an arithmetic overflow, an overflow switching element switchable between a non-overflow and an overflow condition and normally arranged in the non-overflow condition, means for sensing the result register for indicating an overflow and coupled to said overflow element to place same in the overflow condition after an executed command has been sensed to overflow, first control means coincidentally responsive to the overflow condition of said overflow element and to a signal from said executing means representative of a fetched conditional transfer command and operative upon such coincidence to cause the fetching means to then fetch the command at the address accompanying the conditional transfer order, second control means coincidentally responsive to a non-overflow condition of said control element and a signal from said executing means representative of a fetched conditional transfer command and operative upon such coincidence to cause the executing means to skip the conditional transfer order and to initiate the fetching of the command at the next sequential address in said storage means, third control means coincidentally responsive to the non-overflow condition of said overflow element and to a signal from said executing means representative of a fetched command other than a conditional transfer command and operative upon such coincidence to allow the executing means to continue the commanded execute operation, and fourth control means coincidentally responsive to the overflow condition of said overflow element and to a signal from said executing means representative of a fetched command other than a conditional transfer command and operative upon such coincidence to halt the operation of the computer and to indicate the unanticipated overflow to an operator.

References Cited in the file of this patent

UNITED STATES PATENTS

| | | |
|---|---|---|
| 2,636,672 | Hamilton | Apr. 28, 1953 |
| 2,800,277 | Williams | July 23, 1957 |
| 2,810,516 | Tootill | Oct. 22, 1957 |
| 2,939,634 | Beek et al. | June 7, 1960 |

FOREIGN PATENTS

| | | |
|---|---|---|
| 154,322 | Australia | Nov. 26, 1953 |
| 154,449 | Australia | Dec. 9, 1953 |
| 705,479 | Great Britain | Mar. 17, 1954 |
| 1,014,373 | France | June 11, 1952 |
| 1,056,750 | France | Oct. 21, 1953 |

OTHER REFERENCES

Proc. of the IRE, "The Binac," by Auerbach et al., January 1952, pp. 12 to 28.

BINAC Machine (pages 1 to 7, 14, 15, 26–30; 33–37).